Figure 1:
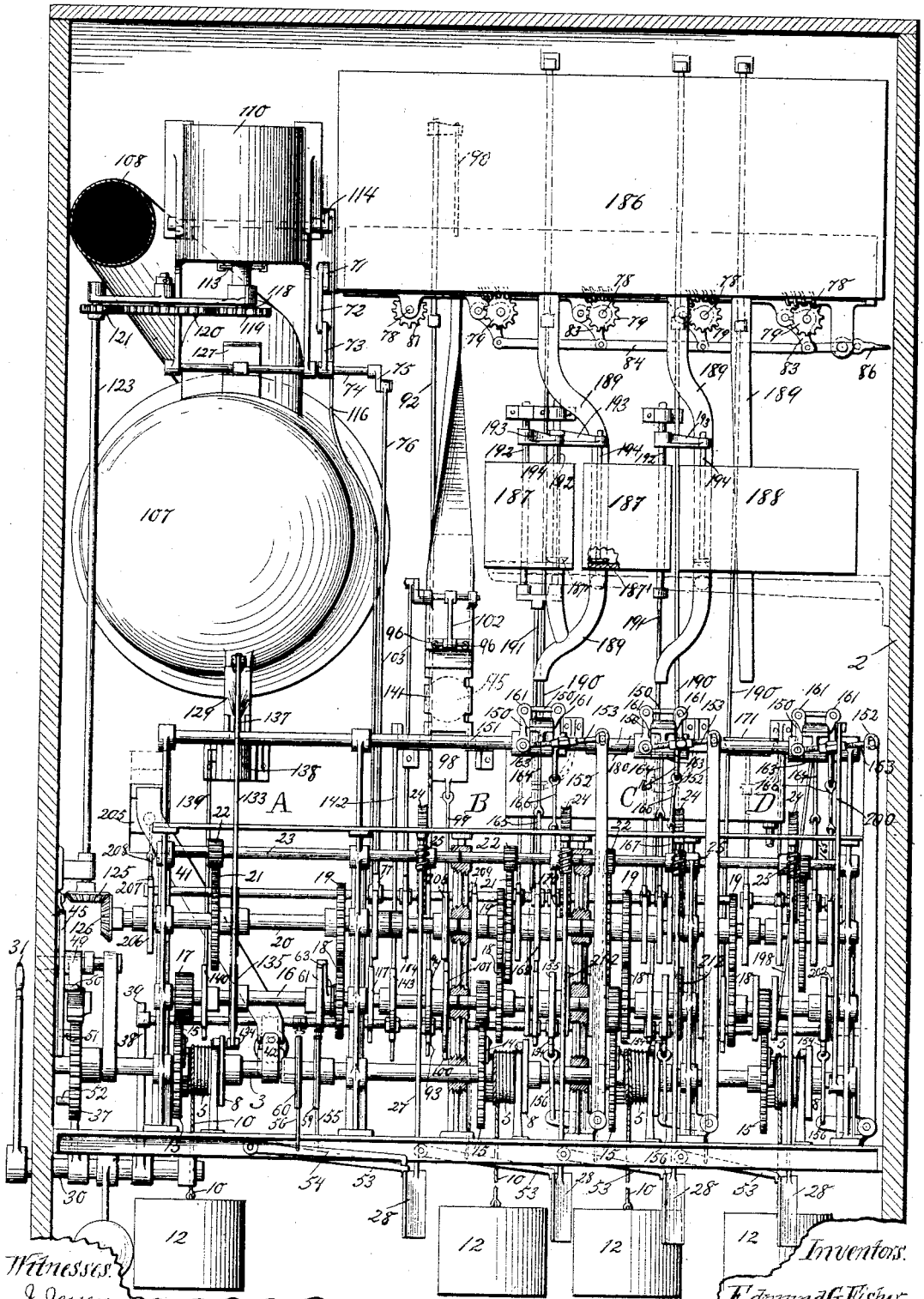

(No Model.)  6 Sheets—Sheet 1.

E. G. FISHER & R. McFARLANE.
AUTOMATIC CAMERA.

No. 444,488. Patented Jan. 13, 1891.

Witnesses:
J. Jensen
J. W. Roberts

Inventors:
Edmund G. Fisher
Robert McFarlane

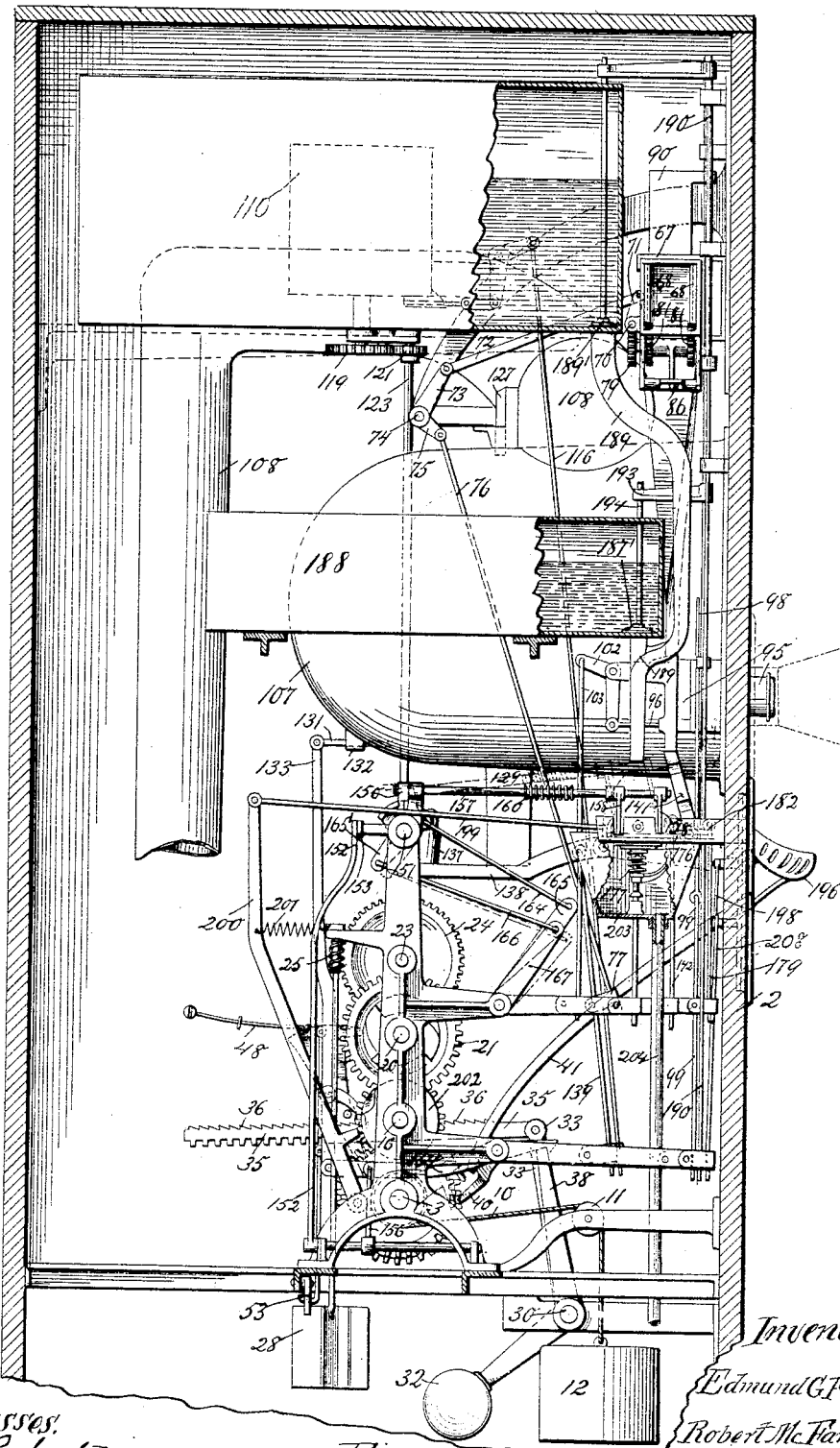

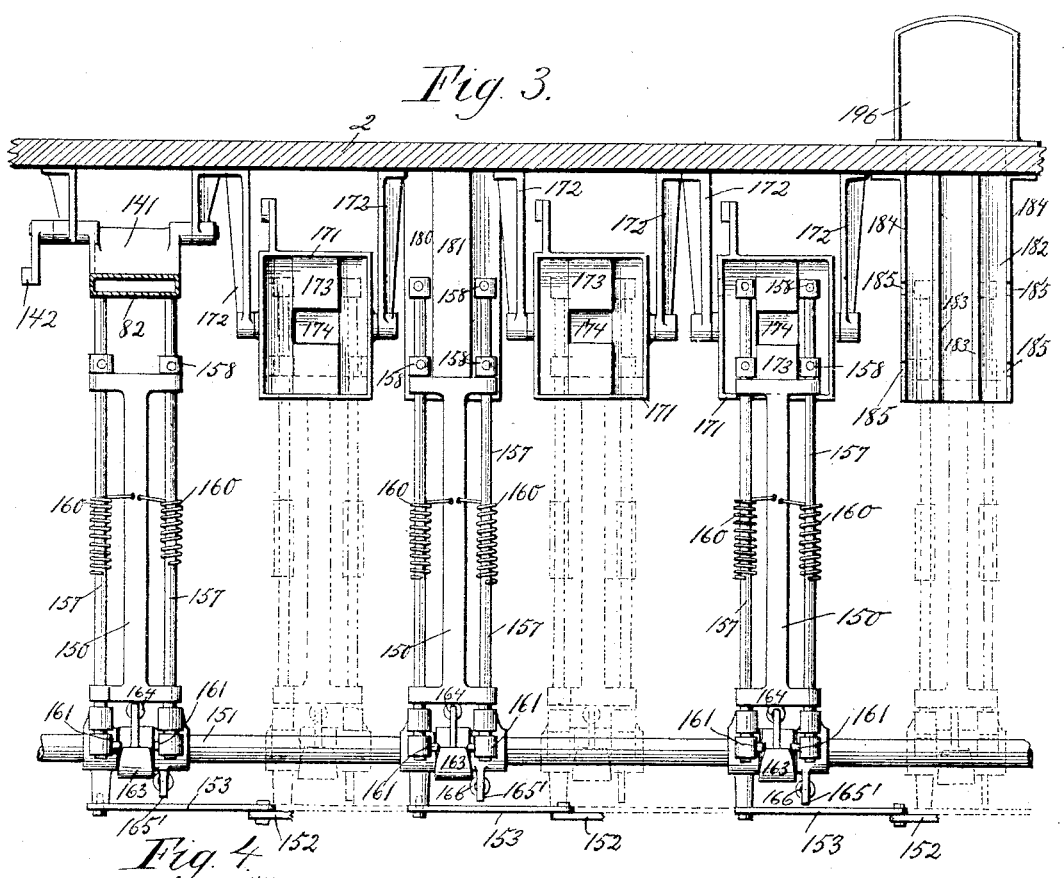

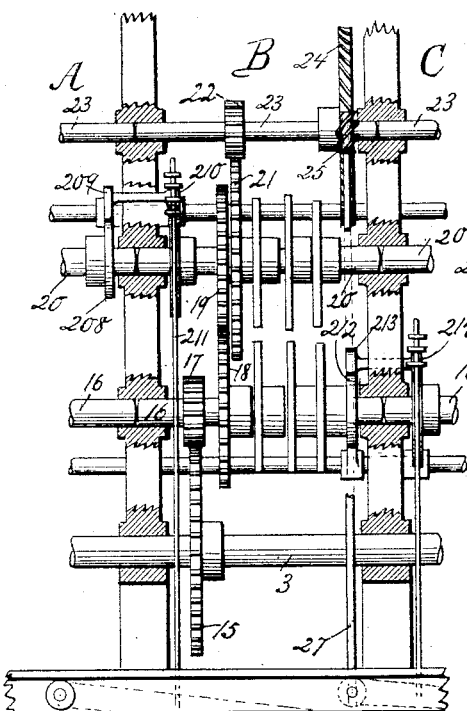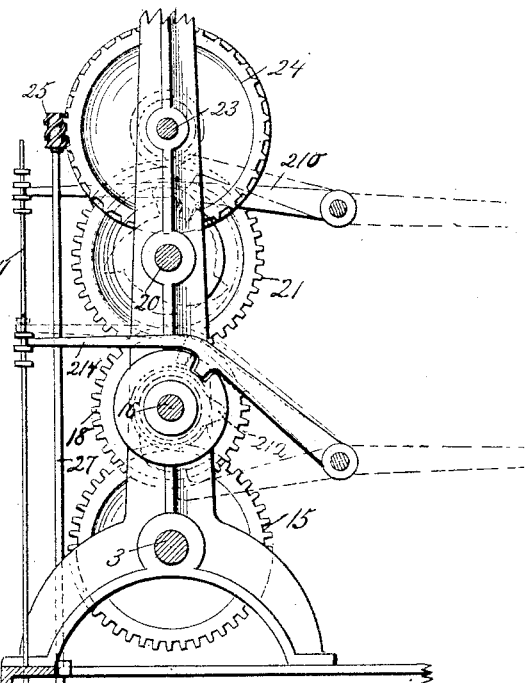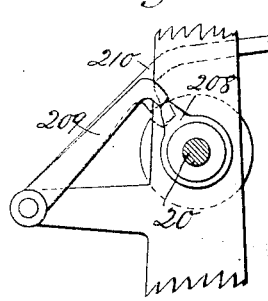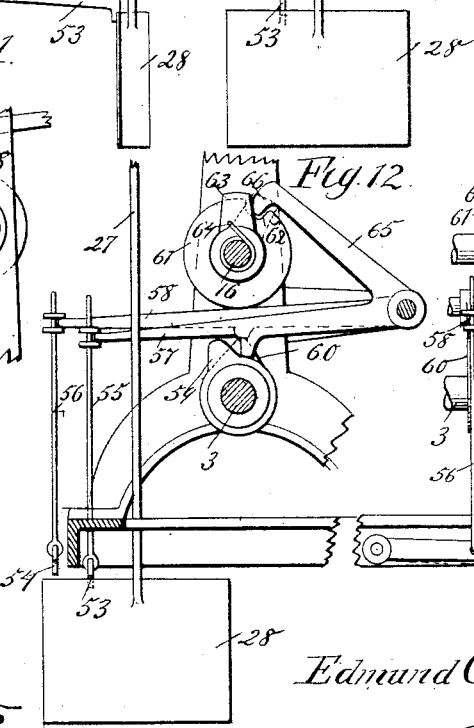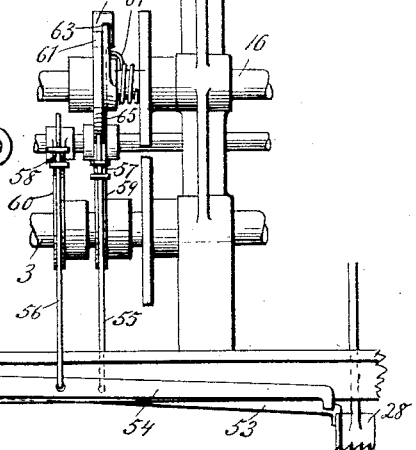

(No Model.) 6 Sheets—Sheet 5.
E. G. FISHER & R. McFARLANE.
AUTOMATIC CAMERA.
No. 444,488. Patented Jan. 13, 1891.
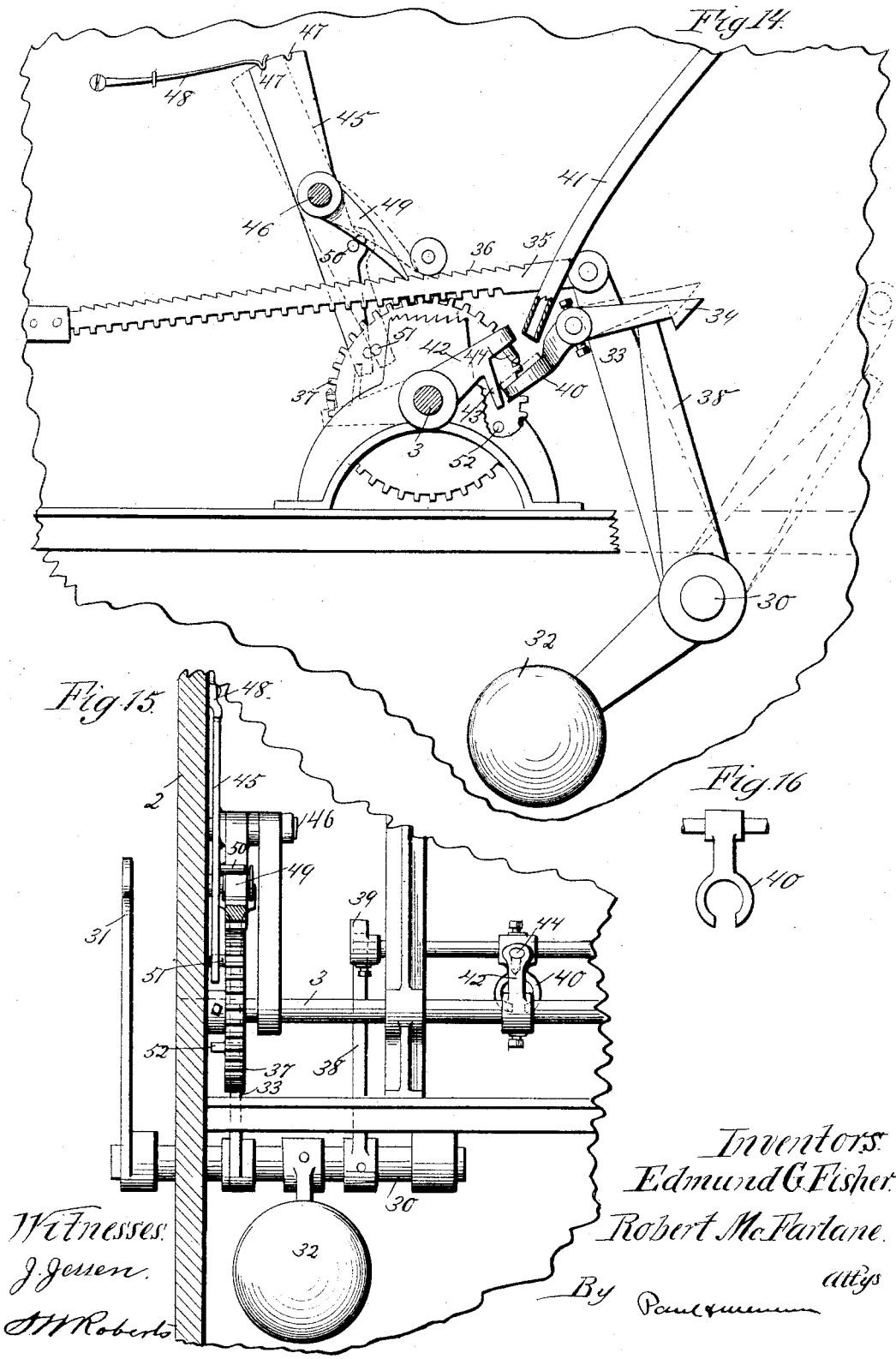
Witnesses:
J. Jessen.
J. W. Roberts.
Inventors:
Edmund G. Fisher.
Robert McFarlane.
By Paul & _____ attys

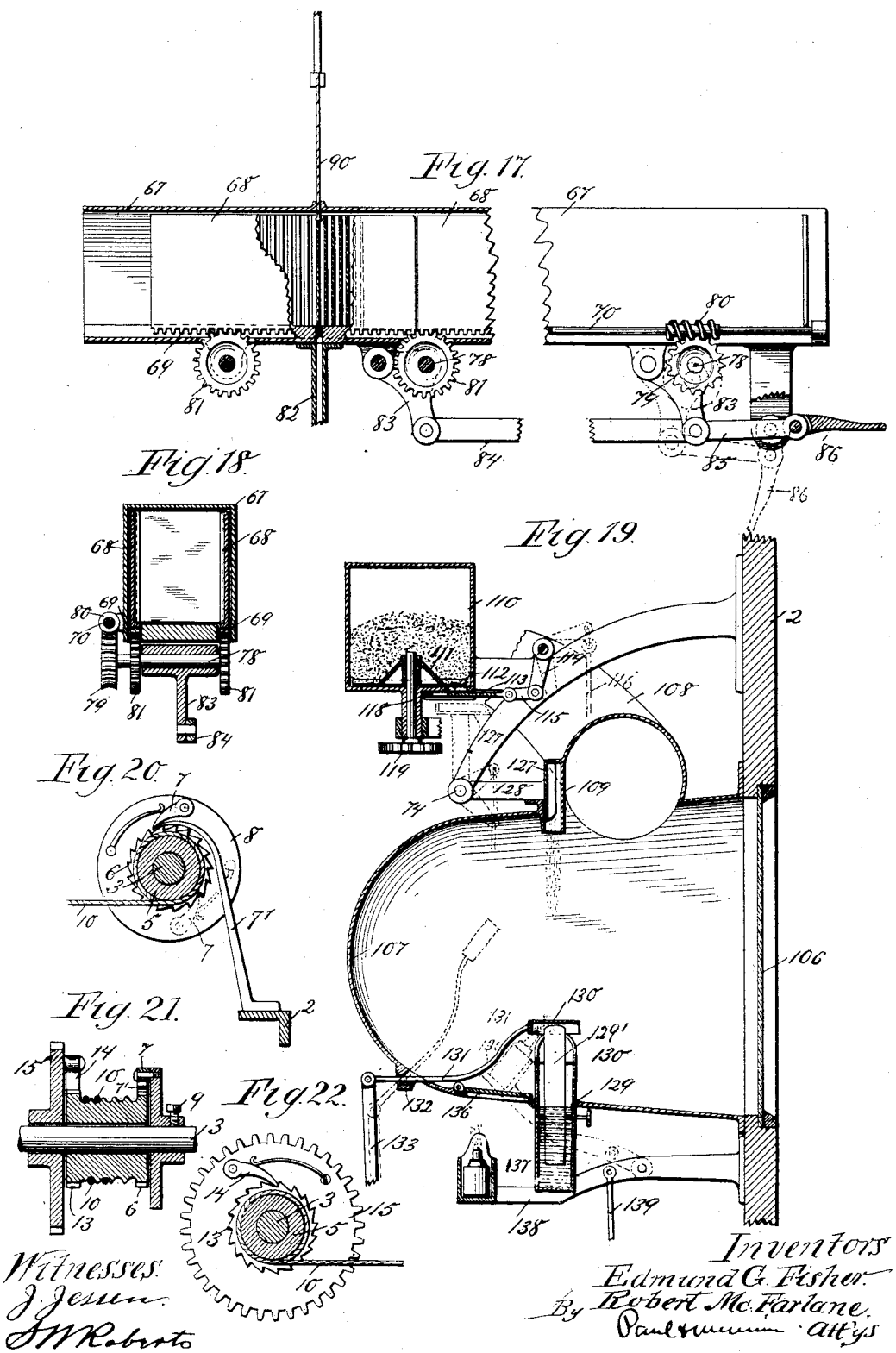

UNITED STATES PATENT OFFICE.

EDMUND G. FISHER AND ROBERT McFARLANE, OF MINNEAPOLIS, MINNESOTA, ASSIGNORS TO THE FISHER SPECIALTY MANUFACTURING COMPANY, OF SAME PLACE.

AUTOMATIC CAMERA.

SPECIFICATION forming part of Letters Patent No. 444,488, dated January 13, 1891.

Application filed March 18, 1890. Serial No. 344,302. (No model.)

*To all whom it may concern:*

Be it known that we, EDMUND G. FISHER and ROBERT McFARLANE, of Minneapolis, in the county of Hennepin and State of Minnesota, have invented certain Improvements in Automatic Cameras, of which the following is a specification.

The object of this invention is to provide an automatic mechanism for the taking of pictures, which when set in motion will automatically carry out all of the steps in the process of taking a picture, developing and fixing it, and then delivering the completed picture, the mechanism being preferably controlled by a device that permits it to be put in operation only upon the introduction of a suitable coin.

Other objects of the invention will appear from the following detailed description, taken in connection with the accompanying drawings, in which—

Figure 1 is a rear elevation of our machine with the inclosing casing partly broken away and partly in section. Fig. 2 is a side elevation with the casing partly broken away and partly in section and with the walls of the tanks and catch-basin also partly broken away. Fig. 3 is a detail plan view of the plate-carriers, showing them in full lines in one position and in dotted lines in another position. Fig. 4 is an end elevation of one of the plate-carriers. Fig. 5 is a side elevation, and Fig. 6 is a transverse section, of one of the trays on which the plates are held while being subjected to the chemicals for the purpose of developing and fixing the picture and also while being washed. Fig. 7 is a detail of the end of the coin-chute and its closing-plate. Fig. 8 is a detail of the mechanism for ejecting the finished picture. Figs. 9, 10, 11, 12, and 13 are details of the mechanism for holding the several parts of the operating mechanism and releasing each part when the devices operated by it are to be brought into operation. Figs. 14, 15, and 16 are details of the coin-controlling device and the mechanism for applying power to the driving mechanism. Figs. 17 and 18 are details of the plate-holder and its operating mechanism. Fig. 19 is a detail of the flash-light mechanism. Figs. 20, 21, and 22 are details of the mechanism for winding the weight or the equivalent for applying power to drive the machine.

This apparatus comprises, in general terms, a suitable plate-holder that is loaded with a number of prepared plates upon which the pictures are to be taken, a camera to which the plates are passed from the plate-holder and in which they are exposed, a flash-light, and a series of plate-carriers which take the plates after they have been exposed in the camera and cause them to be subjected first to a suitable developer, then to be washed, then to be subjected to a fixing solution, then to be washed again, and finally to be ejected from the machine. These various operations take place automatically and in the proper order and the entire mechanism is adapted to be put in operation by a single movement of a lever after a coin of the required value has been put in the machine.

In the drawings, 2 represents a suitable casing, within which the mechanism of the machine is inclosed. Arranged within this casing is a clock-work mechanism by which the various parts of the apparatus are put in motion. This clock-work mechanism is divided into several parts, and it is so arranged that these parts operate successively, the operation of one beginning as or just before the preceding one ceases. These several parts of the clock-work we have indicated as A, B, C, and D, and for brevity of description we have referred to them hereinafter as "clock-work A," "clock-work B," "clock-work C," and "clock-work D." Clock-work A, which is the first to operate, controls the plate-reservoir and feeds the plates to the camera, exposes them therein, operates the flash-light when a plate is exposed, and discharges the plate from the camera. Clock-work B is then set in motion and it is provided with a plate-carrier that picks up the plate and carries it over a suitable support, where it is subjected to a suitable developing solution, and is then washed and then dropped by the carrier upon a shelf, where it is picked up by a similar carrier operated by clock-work C and carried over a support, where it is subjected to the fixing solution and then washed, and then carried over another support, where it is again washed, and then picked up by the carrier operated by clock-work D and moved forward and placed upon a suitable shelf or holder, from which it is ejected from the machine.

The clock-works A, B, C, and D are substantial duplicates of each other and but slightly different from clock-work A, and a description of the operation and construction of one will serve for all.

The several clock-works are provided with a common winding-shaft 3, that is mounted in suitable bearings in the casing 2 and extends across the machine, as shown in Fig. 1. This shaft is provided with a series of winding-drums 5, one for each clock-work. These drums are each provided with a ratchet 6, that is engaged by a pawl 7, secured upon a disk 8, that is secured upon the shaft by means of a set-screw 9. A cable 10 is arranged upon each drum and passes preferably over an idler-pulley 11 and carries a suitable weight 12. Each drum is also provided with a ratchet 13, that is engaged by a pawl 14, secured upon a gear-wheel 15, the gear-wheel 15 forming the first wheel of the train of gearing of the clock-work.

The shaft 3 is turned forward to wind up the weights and then back to its original position. As the shaft is turned forward the pawl 7 engages the ratchet 6 on the drum and turns it to wind up the weight, moving from the position shown in full lines in Fig. 20 to the position indicated by dotted lines in the same figure. As the shaft 3 is reversed the drum is prevented from turning back with it by the ratchet 13 and the pawl 14 on the gear-wheel 15, while the disk 8 reverses with the shaft, carrying the pawl 7 with it. A stationary pawl 7' is arranged on the frame of the machine and projects over the ratchet 6. As the disk 8 is reversed the pawl 7 rides over the pawl 7', which raises the pawl 7 from the ratchet and leaves the drum free to turn.

Arranged parallel with the shaft 3 in each clock-work is an independent shaft 16, provided with a pinion 17, that engages the gear-wheel 15 on the shaft 3. The shaft 16 is also provided with a pinion 18, that meshes with the pinion 19 upon a shaft 20, and this in turn is provided with a wheel 21, meshing with the pinion 22 upon a shaft 23. The shaft 23 carries a worm-wheel 24, that engages a worm 25 on a shaft 27, carrying a fan or governor 28. In the particulars thus far described the four clock-works are similar.

The mechanism for winding all of the clock-works at once is as follows: A shaft 30 is mounted in bearings in the casing, and extends through the casing, and is provided at its outer end with a lever 31. A weight 32 is supported upon the shaft 30, and tends to return it to its normal position after it has been moved by the lever. An arm 33 is also secured to the shaft 30, and is connected to a rack-bar 35, having upon one side a series of ratchet-teeth 36. This rack-bar is in engagement with a gear-wheel 37 upon the winding-shaft 3. When the lever is moved forward, the rack-bar engaging the gear-wheel 37 turns the shaft 3, and with it all of the drums of the clock-works, thereby winding up all of the weights at once. The shaft 30 is normally locked in position by a suitable device that can only be released by the introduction of a suitable coin, and the machine is so arranged that the clock-work cannot start until the shaft 30 has returned to its normal position and been again locked by the coin-controlled mechanism. The gear-wheel 37 is secured to the shaft 3 and turns with it. The shaft 30 has secured to it an arm 38, that is normally engaged by a catch 39, having a hook-shaped end that engages the end of the arm 38. We also provide a coin-support 40, having an open center and a slot from said center through the circumference of said support, as shown in Fig. 16. This support is arranged beneath a coin-chute 41, that has its receiving end in position to receive a coin from the outside of the casing. Arranged upon the shaft 3 is a projecting arm 42, having a lug 43, that projects beyond the coin-holder 40 and in close proximity thereto, and a stud 44, that projects above the coin-holder and over its open center. When a coin is inserted, it passes through the coin-chute and drops upon the coin-holder 40, being prevented from sliding off said coin-holder by the projecting lug 43. The catch 39 is so arranged as to permit a slight movement to the shaft 30 without raising the catch, and this movement is sufficient to turn the shaft 3 a short distance and bring the end of the stud 44 in contact with the surface of the coin, if one is in position upon the coin-holder 40, and thereby to raise the latch 39 from engagement with the arm 38. If there is no coin upon the holder, or if a washer having an open center has been dropped in instead of a coin, the stud 40 will not raise the latch 39. After the latch 39 is raised a further movement of the shaft 30 and the rack-bar 35 causes the shaft 3 to be turned, the stud 44 passing through the slot in the coin-holder 40 and causing the coin to drop out of the coin-holder, and the weights of the clocks are thereby all wound up.

We provide means by which a reverse movement of the rack-bar 35 is prevented until after it has been moved the entire length of its throw. For this purpose the rack-bar is provided, as before stated, with a series of ratchet-teeth 36 upon its upper surface. An arm 45 is pivoted upon a stud 46, and its lower end projects alongside the wheel 37. The upper end of the arm 45 is provided with notches 47, that are adapted to be engaged by a spring-latch 48. This latch engages one of the notches 47, and holds the arm in either position in which it may be, but does not prevent movement of the arm when power is applied to its lower end. A pawl 49 is mounted upon the stud 46, and is adapted to engage the ratchet-teeth 36 in the rack-bar 35. A pin 50 is provided upon the arm 45 beneath the pawl 49. When the arm is in position indicated by full lines in Fig. 13, the pawl is free to engage the ratchet-teeth in the bar 35. When the arm is in the position indicated by dotted lines in the same figure, the pawl is raised and the rack-bar may then be reversed. The wheel 37 is provided with the pins 51 and 52, that are adapted to engage the lower end of the arm 45. As the rack-bar reaches the limit of its movement in one direction the pin 51 will strike the lower end of the arm 45 and move it into the position shown in full lines in Fig. 14, thereby permitting the pawl 49 to engage the ratchet-teeth 36 upon the rack-bar. When the rack-bar reaches the limit of its movement in the other direction, the pin 52 strikes the opposite side of the arm 45, and turns said arm into the position indicated by dotted lines in Fig. 14, thereby moving the pawl out of engagement with said ratchet-teeth. It will be seen that with this means the shaft 3 can only be turned after the introduction of a suitable coin, and that after the rack-bar has been started it cannot be reversed until it has been moved the full length of its throw. We also prefer to provide means which prevent the clock-work from starting until the rack-bar has been moved forward and back to the limit of its movement, the coin has been dropped from the coin-holder, and the latch has re-engaged the arm on the shaft 30, thereby preventing the machine from operating again until after another coin has been dropped into the slot. The means which we use for this purpose consist, preferably, of two stop-bars 53 and 54, that are arranged to be brought in contact with the fan 28. As here shown, the bars are pivoted and are connected to rods 55 and 56, and these rods are connected to the pivoted levers 57 and 58. Cams 59 and 60 are arranged upon the shaft 3. When the shaft 3 is in its normal position—that is, the position in which it is left when the machine is wound up—the toe of the cam 60 will be in engagement with the lever 58, and the stop 54 will be raised clear of the fan. The cam 59, however, will not be in engagement with the lever 57, and the stop 53 will be dropped down and in contact with the fan, thereby preventing the clock-work from running. Above the shaft 3 upon the shaft 16 is a disk wheel 61, having a notch 62 in its periphery. A plate 63 is arranged upon the shaft 16, being connected thereto by a spring 64, which tends to hold the plate in position shown by dotted lines in Fig. 12, in which it covers the notch 62. The plate 63 projects a short distance beyond the periphery of the disk wheel 61. The lever 57 has a projecting arm 65, provided with a toe or lug 66 upon its end, and this arm projects above the disk wheel 61, and the lug 66 is adapted to engage the notch 62 when the shaft 16 is at rest. When the shaft 3 is in its normal position at rest and when the first clock-work is not running, the stop 53 will be in engagement with the fan, thus preventing any movement of the clock-work. When the shaft 3 is turned to wind the weights, its first movement carries the cam 60 from under the lever 58. This permits this lever to drop down and the stop 54 to engage the fan. At the same time as the cam 59 turns forward with the shaft 3 it raises the lever 57 and brings its stop 53 away from the fan. The cam 59 passes the lever 57 very quickly; but before the lever has time to drop down again the spring 64 throws forward the plate 63 into the position shown by dotted lines in Fig. 12, so that it comes under the lug 66 upon the arm 65, and thereby prevents this lug from dropping back into the notch 62. The fan, however, is now held by the stop 54, and the machine remains at rest until the shaft 3 has made its complete movement forward and back, when the cam 60 raises the stop 54, and both stops being now raised the machine will begin to run. When the shaft 16 has made a full revolution, the projection 66 on the arm 65 pushes back the plate 63 and drops into the notch 62, thereby stopping the machine.

As soon as the first clock-work starts the various mechanisms controlled by it are put in operation one after the other, or simultaneously, as required. These parts are all preferably operated by means of cams upon the shafts of the clock-work. Pivoted levers are provided that are held against these cams by suitable springs. These levers are connected with the operating devices by means of suitable rods or wires. As soon as the proper time has been reached in the operation of the clock-work for any particular device to operate the cam permits the lever to be moved by its spring, thereby permitting the desired operation to be imparted to the device.

The plates to be fed into the machine are preferably arranged in a plate holder or reservoir 67, that is arranged upon the upper part of the machine. This reservoir consists of a rectangular frame open at both ends and provided with sectional plate-holders 68. The plate-holders are arranged opposite each other against the side walls of the reservoir, and they may be inserted after being loaded with plates through one end of the reservoir. The plate-holders are each provided with gear-teeth 69 upon their lower edges, by means of which they are fed forward through the reservoir. A shaft 70 extends lengthwise of the reservoir, being mounted in suitable bearings, and is provided at its end with a crank-arm 71, that is connected by a link 72 with a crank 73 upon a shaft 74. The shaft 74 has a crank-arm 75, and is connected by the rod 76 with a lever 77, that is governed by a cam on the clock-work. A series of short shafts 78 are arranged beneath the reservoir, and they are provided with worm-wheels 79, that engage the worm 80 upon the shaft 70. These shafts are also provided with pinions 81, that engage the teeth on the lower edges of the plate-holder 68. As the shaft 70 is rotated by the means described the shafts 78 are also rotated, and the plate-holders and the plates carried by them are moved along the reservoir. As each plate comes over a plate-conductor 82 it is freed from the plate-holder and drops down through the plate-conductor and passes to the camera, as hereinafter described. When the plate-holders reach the end of the reservoir, they drop out and may be again filled and inserted at the opposite end of the reservoir.

For the purpose of permitting the ready insertion of the plate-holders, we prefer to mount the shafts 78, that are arranged between the filling end of the reservoir and the plate-conductor 82, in swinging arms 83. These arms are all connected by a bar 84, and the end arm is connected by a link 85 to a locking-lever 86. This lever is pivoted upon a suitable support, and the link 85 is pivoted to it at a short distance from the pivotal point of the lever. When the lever 86 is thrown down into the position indicated by dotted lines in Fig. 17, the shafts 78 will be lowered and the pinions 81 will be carried below the bottom of the reservoir. The plate-holders, with the plates between them, may then be inserted into the open end of the reservoir, and pushed forward therein until they strike the section that is over the plate-conductor, this section remaining in the reservoir after the others have passed out. The lever 86 is now raised to the position shown by full lines in Fig. 17, and in so doing it passes the dead-center, and the arms 83 are all locked in position with their pinions 81 in engagement with the plate-carriers.

A plate-ejector 90 is arranged over a slot or opening in the top of the reservoir, and is adapted to be depressed and push the plate that is beneath it into the plate-conductor 82. This ejector is connected to a rod 92, that is connected to a lever 93 and operated by a cam 94 upon the shaft 16. After the plate has entered the plate-conductor it drops down into the camera 95, where it is opposite the lens, and in this position it is held by the pin 96, which projects into the camera. The camera is provided with a slide 98, operated by a rod 99 and lever 100, this lever being controlled by a cam 101 on the shaft 16. At the proper time in the operation of the machine the slide is moved to expose the plate in the camera. The pins 96 are controlled by a bell-crank lever 102 and a rod 103, that is controlled by a cam 104 on the shaft 20. We also prefer to provide means for causing a flash-light at the time that the plate is exposed in the camera. For this purpose we prefer to arrange a glass 106 in the front of the camera, in the rear of which is a deflector 107. Connected with this deflector is a pipe 108, which carries off the gases, and a spout 109, through which the flash-powder is discharged into the deflector. A receptacle 110 is arranged above the deflector and has within it a conical rotating feed-plate 111. An opening 112 is formed in the bottom of the receptacle, and beneath it is a slide 113, that is connected to a bell-crank lever 114 by a link 115. This lever is operated by a rod 116 from a cam 117 upon the shaft 16. The feed-plate 111 is rotated by a shaft 118, provided with a pinion 119, that is engaged by a gear-wheel 120, that is in turn engaged by a pinion 121 upon a shaft 123. This shaft is provided with a bevel-pinion 125, that engages a bevel-pinion 126 upon the shaft 20. By this means the feed-plate 111 is given a partial rotation with each operation of the clock-work A, thereby insuring the delivery of a portion of the material upon the slide 113. A tray 127 is arranged beneath the slide 113, being supported upon the shaft 74 by an arm 128. When the slide is opened, this tray receives a portion of the powder from the receptacle. The tray is then turned down from the position indicated by dotted lines in Fig. 19 to the position shown by full lines in the same figure, and the powder carried by the tray is poured through the spout 109 to the interior of the deflector 107. At the bottom of the deflector is a lamp 129, having a wick 129', fed by a supply of alcohol. An extinguisher 130 is arranged over this lamp, being mounted upon a rod 131, that extends through the wall of the deflector, resting upon a bearing 132, upon which it is both free to turn and slide. A rod 133, connected to the rod 131, is connected to a lever 134, and controlled by a cam 135 upon the shaft 16. The deflector is also provided with a hinged plate 136, covering an opening in its lower wall, and a small alcohol-lamp 137 is mounted upon a lever 138. This lever is connected to a rod 139, that is governed by a cam 140 on the shaft 16. The operation of these parts is as follows: The lamp 137 is to be kept burning, and when an exposure of a plate is to be made by the camera the lamp is raised in position inside the deflector. (Indicated by dotted lines in Fig. 19.) As the lamp rises and passes into the deflector, the extinguisher 130 also rises to the point indicated by dotted lines in Fig. 19, thus leaving the wick of the lamp 129 exposed, and it will be lighted by the lamp 137. The lamp 137 is then withdrawn and the flash-powder enters the deflector and is ignited and flashes therein. The extinguisher then covers over the wick and extinguishes the flame of the lamp 129. The flash will light up the face of the person or the object in front of the camera just at the instant that the exposure is made.

When the plate is released from the camera, it drops through the lower end of the plate-conduit into a tray 141, that stands normally in an inclined position, forming a continuation of the plate-conduit, as shown in Fig. 2. This tray is governed by a cam on the clock-work, and it turns down to a horizontal position after receiving the plate. The tray is moved by a rod 142, operated by a cam 143 on the shaft 16. As soon as the tray reaches this position the plate is taken up by the first plate-carrier and is moved to a position and is deposited on a tray and is then subjected to the developer and is afterward washed. This plate is then picked up again by the carrier and is moved over and deposited upon a shelf, from which it is picked up by the second carrier and is placed on a second tray, where it is subjected to the fixing solution and is again washed, and then it is again picked up by the second carrier and deposited on a third tray, where it is again washed. It is taken off from this tray by the third carrier and moved over and placed upon a shelf, from which it is ejected from the machine.

As before stated, the clock-works A, B, C, and D are substantially alike in construction. The clock-work B begins to operate just before the clock-work A ceases, the clock-work A having control of all of the operations of the machine up to the time when the plate is delivered to the first plate-carrier.

Each of the clock-works B, C, and D is provided with a fan or governor 28, like that of the clock-work A, and with a stop 53. The clock-work A is provided on its shaft 16 with a cam 208, that engages an arm 209, that is in turn connected to a lever 210. This lever is connected by a rod 211 with the stop 53. Just before the clock-work A stops it raises by this means the stop 53 of clock-work B and thereby releases it. (See Figs. 9, 10 and 11.)

Each of the clock-works B and C is provided on its shaft 20 with a cam 212, engaging an arm 213, connected with a lever 214, controlling the stop 53 of the next clock-work and operating to release it at the proper time. (See Figs. 9 and 10.)

The plate-carriers are alike in construction and operation, so that a description of the construction of one will apply to all. Each plate-holder consists of a frame 150, mounted upon a stationary shaft 151 and free to slide longitudinally thereon and also to turn thereon. A bell-crank lever 152 has its upper end connected to the frame 150 by means of a rod 153. The lower end of this lever is connected to a lever 154 by a link 156, and this lever is controlled by a cam 155 upon the shaft 16. By this means the plate-carrier is given its lateral movements upon the rod 151. The first plate-carrier moves to the position shown in full lines in Fig. 3, then to the position shown in dotted lines in that figure, and then to the position occupied by the second carrier in that figure. The second carrier moves to the position shown by full lines in Fig. 3 at the center of the figure, then to the position shown by dotted lines in that figure, then to the position occupied by the third carrier in that figure. The third carrier moves to the position that it occupies in Fig. 3, and from there to the position that it occupies in dotted lines in that figure. Each carrier is also provided with means for raising and holding a plate. For this purpose each carrier is provided with the longitudinal shafts 157, to which are attached or secured the lifting-arms 158, having projections 159, that are adapted to extend under and engage the plate. Springs 160 surround the shafts 157 and engage the frame of the machine. These springs tend to throw the lifting-arms 158 inward toward each other into the position shown in full lines in Fig. 4. Each of the shafts 157 is provided with a depending arm 161. A cam 163 is mounted upon the shaft 151 between the two parts of the frame 150. This cam is connected by a rod 164 with a lever 165', that is controlled by a cam 169 on the shaft 20. By this means, at the proper intervals of time, the arms 158 are separated by moving the cam 163 between the arms 161, and thereby turning the shafts 157 against the tension of the spring 160. By this means, when the arms 158 are separated and in the position shown in the lower dotted lines in Fig. 4, the carrier is adapted to drop or pick up the plate. The carrier is also provided with means for raising or lowering it for the purpose of causing it to raise the plates and carrying them over and depositing them upon the shelves or on the trays, where they are held while being washed or subjected to the developing solutions. For giving the plate-carriers this up-and-down motion they are arranged to turn upon the shaft 151, upon which they are mounted, and each one is operated by means of an arm 165, secured to the frame and connected to a rod 166, that is connected to a lever 167, controlled by a cam 170 on the shaft 20.

Arranged within the casing are a series of trays 171, upon which the plates are deposited by the carrier, and upon which they rest while being subjected to the developer (the fixing solution) or while being washed. Each of these trays is pivoted upon brackets 172, and is provided with a raised center 173. In the center of each tray is an opening 174. A plate 176 is arranged to close the opening in the bottom of the tray. This plate is hinged upon the top of a rod 175, and is held against the bottom of the tray by a spring 177. The hinge of the plate permits it to turn freely with the tray, and each tray is connected to a rod 178, that is connected to a lever 179, controlled by a cam on the shaft 20. By this means the tray 171 is given at certain intervals a rocking motion upon its pivot, as indicated by the full and dotted lines in Fig. 5. A shelf 180, having a raised center 181, is arranged between the first and second tray, and upon this shelf each plate is deposited by the first carrier, and from it is taken up by the second carrier. The first carrier, as already described, takes each plate from the tray 141 at the bottom of the chute and carries it to the first tray 171. It then takes it from this tray and delivers it upon the shelf 180, and this carrier then returns to its original position in readiness to take up another plate. From this shelf it is picked up by the second carrier and deposited on the second tray 171, and from this tray it is taken by the second carrier and deposited on the third tray, when the second carrier returns to its original position. From the third tray it is taken up by the third carrier and deposited upon a shelf 182, arranged opposite the exit-opening in the casing and provided with central ribs 183 and side walls 184, having notches 185 to admit the arms of the plate-carrier. Arranged within the casing is a water-tank 186 and tanks 187, that contain the chemicals for the development of the picture, and a tank 188, that contains the fixing solution. There are preferably three pipes 189 leading from the water-tank, each of which is provided with a valve 189', controlled by a cam on the proper clock-work and operated by a rod 190. The tanks 187 both are provided with valves 187', which are arranged to discharge the material from said tanks 187 into the pipe 189. These valves are operated by a rod 191, controlled by a cam on the shaft of the clock-work B. The rod 191 carries two rods 192, upon which are secured the arms 193, that carry the valve-stems 194. The valves of the two tanks 187 are thus operated simultaneously. The tank 188 is provided with a similar valve operated by the clock-work C by similar means, consisting of rods 191 and 192, and arm 193 and a valve-stem 194.

The operation of these parts in developing, washing, and fixing the picture is as follows: When the first carrier brings the plate to the first tray, it deposits it upon said tray. The valves in the tanks 187 are then opened simultaneously, and a small portion of the chemical in each tank is discharged upon the top of the plate. There is just enough of these chemicals, which are mixed by being passed through the same spout, to cover the surface of the plate. After the developer has been placed on the plate, the tray is given a rocking motion, thereby insuring the spreading of the developer over the plate and the development of the picture. The water is then discharged onto the surface of the plate, washing off the developer. The plate is then again picked up by the carrier and moved over and placed on the shelf 180. From this shelf it is taken up by the second carrier and placed on the second tray. The fixing solution from the tank 188 is then let out of the tank onto the plate, and this tray is then rocked in the same manner as the other, and thereby the fixing solution is equally distributed over the surface of the plate. The water is then discharged onto the plate, and the plate is then again picked up by the second carrier and moved over and placed on the third tray. Here it is again washed while the tray is rocked. It is then picked up by the third carrier and moved over and placed on the shelf 182. A shelf 196 is arranged on the outside of the casing to receive the picture. A slide 197 covers the exit-opening at all times, except when a picture is to be discharged. This slide is connected by a rod 198 with a lever controlled by a cam on the shaft 20. The slide is opened when a picture is to be discharged. An ejector 199 is connected to a lever 200, controlled by a spring 201 and a cam 202. This ejector pushes the plate after it is deposited on the shelf 182 and through the exit-opening onto the tray on the outside of the casing. A catch-basin 203 is arranged under the trays and receives the water and chemicals discharged from the trays, which may then be led out of the casing through a discharge-pipe 204. We also prefer to provide a slide 205, which covers the opening to the coin-chute while the first clock-work is in operation. This slide is controlled by a cam 206 on the shaft 20 through a lever 207 and a rod 208. As soon as a coin is placed in the coin chute or conduit and the clock-work A is started this slide is closed and remains closed while this clock-work is operated. As soon as the plate has been delivered to the mechanism operated by the clock-work B the first clock-work stops, the slide 205 opens the coin-chute, and the machine is ready to receive another coin and start another picture. By this means the machine is adapted to operate on several plates at the same time, as each set of mechanism may be operating upon a different plate.

Another special advantage is that the chemicals for the developer are kept separate and in close tanks and mixed as used, and the chemical for fixing the picture is also kept in a close tank, and that both the developing and fixing materials are discharged in small quantities onto the plates, as required, there being only a sufficient amount discharged at each operation to cover the surface of the plate. The chemicals are thus kept fresh and will be suitable for use for a long time.

The machine is throughout automatic and takes and delivers a complete and perfect picture.

It will be obvious that the details of various parts of the mechanism may be varied without departing from our invention; and we therefore do not wish to be limited to the details of the construction. It will be understood, also, that by the term "clock-work" we include any suitable gearing or operating mechanism adapted to be operated by any suitable motive power.

We claim as our invention—

1. An automatic picture-taking machine comprising, in combination, a plate-holder, a camera, a plate-carrier, tanks for holding the developing, fixing, and washing materials, means for operating the plate-holder, camera, and plate-carrier, and means for releasing from the tank the materials for developing, fixing, and washing the pictures.

2. An automatic picture-taking machine comprising, in combination, a plate-holder, a camera, plate-carriers, tanks for holding the developing, fixing, and washing materials, means for operating the plate-holder and camera, and independent means for operating the plate-carriers and discharging the materials from the tank.

3. An automatic picture-taking machine comprising, in combination, a plate-holder, a camera, means for conducting plates from said plate-holder to said camera and depositing them therein, tanks for containing materials for developing, fixing, and washing the picture, and a series of plate-carriers arranged to take the plates from the camera and move them into position to receive the materials from the tanks.

4. An automatic picture-taking machine comprising, in combination, a plate-holder, a camera, tanks for holding the developing, fixing, and washing materials, a series of plate-carriers adapted to take the plate from the camera and move it into position to receive the material from the tanks, mechanism controlling the plate-holder and camera, and independent mechanisms controlling said plate-carriers and tanks, substantially as described.

5. An automatic picture-taking machine comprising a series of clock-works arranged to operate in succession, a plate-holder and camera operated by the first clock-work, plate-carriers, and tanks for holding the developing, fixing, and washing materials operated successively by the other clock-works, substantially as described.

6. An automatic picture-taking machine comprising a camera, means for feeding plates thereto and therefrom, a series of tanks for holding the developing, fixing, and washing materials, a series of plate-carriers, a clock-work for operating said camera, and independent clock-works arranged to operate in succession and controlling said plate-carriers.

7. An automatic picture-taking machine comprising, in combination, a plate-holder, a camera, means for conducting plates from said plate-holder to said camera and exposing them therein, a flash-light, means for holding the developing, fixing, and washing materials, and means for moving the plates from said camera after exposure therein and carrying them into position to receive the material from said tanks, substantially as described.

8. An automatic picture-taking machine comprising, in combination, a series of successively-operating clock-works, each arranged to release the next succeeding clock-work, a coin-controlled device arranged to release the first clock-work, a camera controlled by the first clock-work, and developing and fixing mechanisms operated by the succeeding clock-works, for the purpose set forth.

9. In an automatic picture-taking machine, the combination, with a suitable camera, of a series of plate-carriers, a series of tanks or receptacles adapted to hold the developing, fixing, and washing materials, means for successively operating said plate-carriers and transferring the plates from said camera into position to receive the materials from said tanks, and means for discharging material from said tanks while said plates are in position to receive them, for the purpose set forth.

10. In an automatic picture-taking machine, the combination, with a suitable camera and tanks for holding and discharging the materials for fixing and developing the pictures, of a series of successively-operating plate-carriers arranged to take the plates from said camera and move them into position to receive the materials from the tanks and then into position to be discharged from the machine, for the purpose set forth.

11. In an automatic picture-taking machine, the combination, with means for exposing a plate and then developing and fixing the picture thereon, of a series of successively-operating clock-works, each arranged to set in operation the succeeding one, whereby the several parts of the picture-taking mechanism may be operating upon different plates simultaneously, substantially as described.

12. In an automatic picture-taking machine, the combination, with the operating mechanism, of the winding-shaft 3, provided with the gear-wheel 37, the rack-bar 35, engaging said gear-wheel, the shaft 30, connected with said rack-bar and provided with the arms 38, the locking-dog 39, the coin-holder 40, and the arm 42, secured upon the shaft 3 and provided with the lug 43 and the stud 44, substantially as described.

13. In a machine of the class described, the combination, with the operating mechanism, of the winding-shaft 3, provided with the gear-wheel 37, the rack-bar engaging with said gear-wheel and provided with a series of ratchet-teeth 36, a pawl arranged to engage said ratchet-teeth as the rack-bar is moved in one direction and to be raised therefrom as it is moved in the other direction, and a locking device adapted to release said rack-bar upon the introduction of a suitable coin.

14. In a machine of the class described, the combination, with the camera and the picture developing and fixing devices, of the independent clock-works arranged to operate successively, and thereby to operate said camera and said fixing and developing devices, a winding mechanism common to all of said clock-works, and a coin-controlled locking device connected with said winding mechanism, substantially as described.

15. In a machine of the class described, the combination, with the series of clock-works, of the winding-shaft common to all of said clock-works, substantially as described.

16. In a machine of the class described, the combination, with the series of clock-works, of the winding-shaft common to all of said clock-works, coin-controlled mechanism for releasing said winding-shaft and starting the first clock-work, and means upon each of said clock-works for starting at the proper time the next succeeding clock-work, substantially as described.

17. In a machine of the class described, the combination, with the clock-work, of the winding mechanism, the locking-dog 39, the coin-holder 40, having an open center and arranged beneath a suitable coin-chute, the winding-shaft 3, and the arm 42 upon said shaft provided with the lug 43 and the projection 44, substantially as described.

18. In a machine of the class described, the combination, with a suitable camera, of the plate-reservoir 67, the series of sectional plate-holders 68, arranged therein, and means for feeding said plate-holders along in said reservoir, substantially as described.

19. In a machine of the class described, the combination, with a suitable camera, of a plate-reservoir 67, a plate-conduit leading from said reservoir to said camera, a series of sectional plate-holders 68, arranged in said reservoir, and means for feeding said plate-holders, substantially as described.

20. In a machine of the class described, the combination, with the open-ended reservoir 67, of the plate-holder 68, provided with rack-teeth, pinions arranged to engage said rack-teeth, means for throwing said pinions out of engagement therewith, and means for turning said pinions, and thereby moving said plate-holders along in said reservoir.

21. The combination, with the reservoir 67, of the sectional plate-holders 68, arranged therein and provided with the teeth 69, the pinions 81, engaging said teeth, movable arms 83, supporting said pinions, and the worm-shaft and wheel for driving said pinions.

22. In a machine of the class described, the combination, with a camera and means for exposing a plate therein, of a flash-light and means for operating said flash-light simultaneously with the exposure of said plate in the camera, and automatic mechanism controlling the camera and flash-light operating devices, substantially as described.

23. In a machine of the class described, the combination, with the camera, of the deflector 107, the lamp 129, the powder-holder, and means for discharging a portion of said powder upon the flame of said lamp as the exposure is made by said camera, substantially as described.

24. In a machine of the class described, the combination, with the camera, of the deflector 107, the lamp 129, provided with an extinguisher 130, the lighter 137, and means for discharging the powder upon the flame of said lamp 129, substantially as described.

25. In a machine of the class described, the combination, with the camera, of the deflector 107, the lamp 129, means for lighting and extinguishing said lamp, the powder-receptacle 110, and the tray 127 for receiving powder from said receptacle and discharging it upon the flame of said lamp 129, substantially as described.

26. In a machine of the class described, the combination, with the camera, of the deflector 107, the lamp 129, the powder-receptacle 110, provided with the rotating feed-plate 111, the slide 115, and the movable tray 127, all substantially as described.

27. The combination, with the camera, of a series of plate-carriers operating successively on the same plate, for the purposes set forth.

28. The combination, with the camera and the series of trays 171, of the series of successively-operating plate-carriers.

29. The combination, with the camera, the series of trays 171, and the shelves 180 and 182, of the series of successively-operating plate-carriers, substantially as described.

30. The plate-carrier comprising, in combination, the vertical and laterally-movable frame 150, the shafts 159, mounted thereon and provided with springs 160 and with plate-holding arms 161, and means for separating said arms, substantially as described.

31. The combination, with the plate-carrier, of the tray 171, mounted upon suitable pivots, and means for rocking said tray.

32. The combination, with the plate-carrier, of the pivoted tray 171, provided with a raised center, and means for rocking said tray.

33. The combination, with the plate-carrier, of the pivoted tray 171, provided with a raised center and having an opening in its bottom, the spring-controlled plate closing said opening, and means for rocking said tray.

34. The combination, with the plate-carrier, of the shelf 182 and the plate-ejector, substantially as described.

35. The combination, with the plate-carrier, of the shelf 182, the plate-ejector, and the slide for closing the opening in the wall of the casing.

36. In a machine of the class described, the combination, with the series of clock-works, of the coin-controlling device connected with the first clock-work, the coin-chute, and a slide arranged to close said chute while the first clock-work is in operation.

In testimony whereof we have hereunto set our hands this 14th day of March, 1890.

EDMUND G. FISHER.
ROBERT McFARLANE.

In presence of—
A. C. PAUL,
BESSIE BOOTH.